(12) United States Patent
Clark et al.

(10) Patent No.: US 7,153,085 B2
(45) Date of Patent: Dec. 26, 2006

(54) MULTI-MODAL PACKAGE HANDLING TOOL AND SYSTEM

(75) Inventors: Jeffrey A Clark, Adrian, MI (US); William A Frank, Onsted, MI (US); Salahuddin F Khan, Manitou Beach, MI (US)

(73) Assignee: Aidco International, Inc., Adrian, MI (US)

( * ) Notice: Subject to any disclaimer, the term of this patent is extended or adjusted under 35 U.S.C. 154(b) by 16 days.

(21) Appl. No.: 10/905,241

(22) Filed: Dec. 22, 2004

(65) Prior Publication Data

US 2006/0133917 A1 Jun. 22, 2006

(51) Int. Cl.
*B25J 15/02* (2006.01)

(52) U.S. Cl. .............................. 414/729; 294/2; 901/30

(58) Field of Classification Search ................ 414/729, 414/736, 737, 740; 198/468.4, 468.6; 294/2, 294/3, 64.1, 87.1; 907/15, 30; 483/901
See application file for complete search history.

(56) References Cited

U.S. PATENT DOCUMENTS

| | | | | |
|---|---|---|---|---|
| 3,487,964 A | * | 1/1970 | Riley | 414/550 |
| 4,621,852 A | * | 11/1986 | Maki | 294/86.4 |
| 5,550,953 A | * | 8/1996 | Seraji | 700/263 |
| 5,974,643 A | * | 11/1999 | Hays et al. | 29/39 |
| 6,149,375 A | * | 11/2000 | Hebrank | 414/737 |
| 2003/0120387 A1 | * | 6/2003 | Sherwin | 700/245 |
| 2005/0008469 A1 | * | 1/2005 | Jung | 414/729 |

* cited by examiner

*Primary Examiner*—Donald Underwood
(74) *Attorney, Agent, or Firm*—Dykema Gossett PLLC

(57) ABSTRACT

A multi-modal package handling tool and system uses a robot carrying an end of arm tool incorporating several package handling devices such as vacuum carrying units, extensible package grippers, and a slideably deployable package platform. Each these package handling devices may be used singly, or in combination with each other.

14 Claims, 6 Drawing Sheets

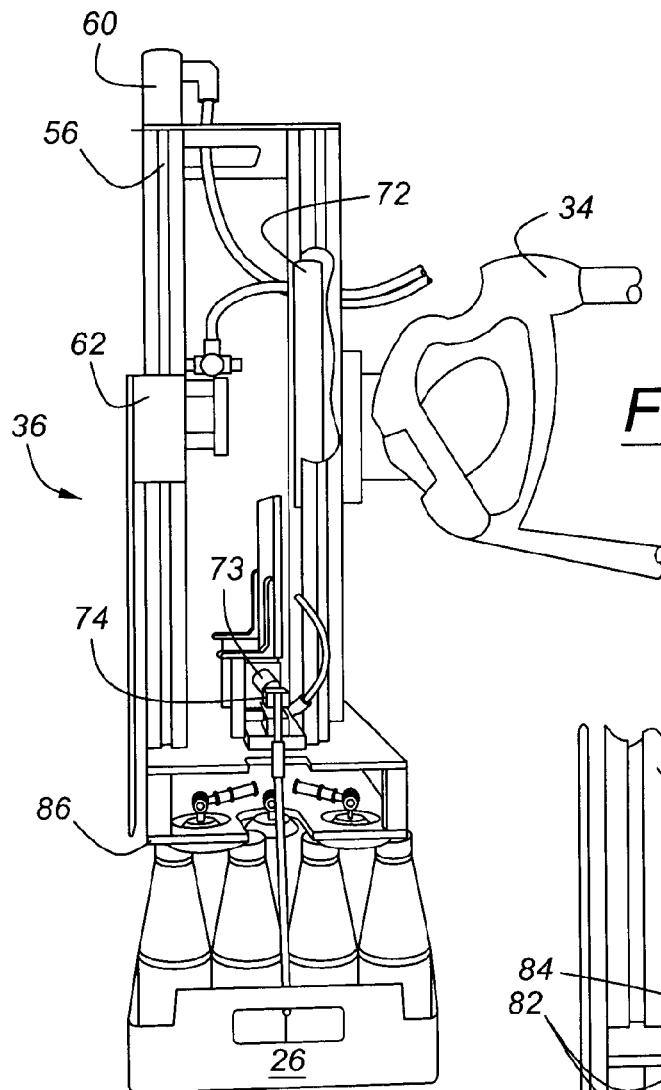
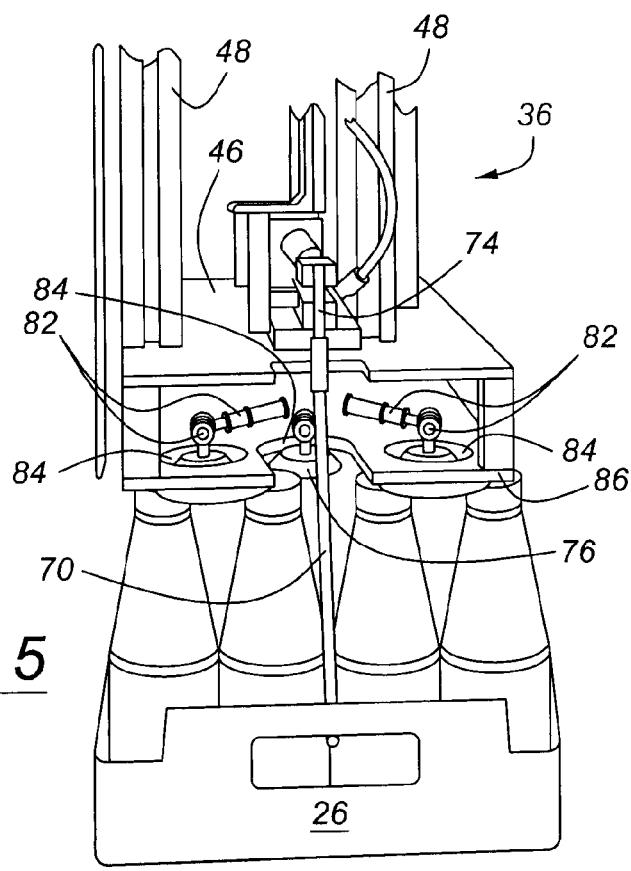

MULTI-MODAL PACKAGE HANDLING TOOL AND SYSTEM

BACKGROUND OF THE INVENTION

1. Field of the Invention

The present invention relates to a tool which may be mounted upon a prime mover, such an industrial robot, for the purpose of handling a variety of different size and shape packages, such as those commonly used for consumer and pre-consumer packaging of various beverages.

2. Disclosure Information

The distribution of various packages of food items, particularly beverages, is rendered more difficult by the fact that beverage containers come in a variety of sizes and shapes. For example, beverages are marketed in 12 ounce cans, one liter bottles, smaller bottles, and larger containers having all sorts of sizes and shapes. Moreover, the packages used to hold such beverage containers come in a scarcely fewer number of sizes and shapes. It is often necessary for beverage distributors to break down pallets or subdivide pallets of beverages at a distribution point, because frequently the beverage retailer whose order is being filled does not desire to take delivery of a full pallet of one particular type of beverage. Thus, a full pallet having but one type of beverage packaged in a single type of package, will need to be broken down. Unfortunately, use of picker and packer employees to handle such packages results in considerable expense for labor.

The present invention uses an end of arm tool mounted on a robot, with the robot preferably mounted on a track, to pick a variety of different types of packages, for the purpose of loading the packages on a pallet for shipment to, for example, a retailer of packaged goods.

SUMMARY OF THE INVENTION

The present multi-modal package handling tool includes a tool platform with a plurality of package-carrying vacuum units arranged in a generally planar array, with the vacuum units being attached to a first portion of the tool platform. A plurality of extensible package grippers is mounted to the tool platform, with extensible grippers having at least a retracted position and an extended position. The tool platform may also have a slidingly deployable package platform mounted thereto, with the package platform having at least a retracted position and an extended position.

Each of the vacuum units mounted to the tool platform has a vacuum head powered by a dedicated vacuum generator. This offers the advantage that in the event that a vacuum leak occurs within any of the vacuum units, vacuum to will not be lost with respect to the remaining units because each of the vacuum heads has an independent source of vacuum. Moreover minor air leaks will not cause the vacuum power of any of the vacuum heads to be lost. Each of the vacuum heads extends through a port formed in a surface plate which is also attached to the tool platform, such that a package engaged by one or more of the vacuum heads will be drawn into contact with the surface plate. This advantageous result occurs because the vacuum units contract axially when the vacuum is applied and this causes the package being secured by the vacuum units to be pulled into contact with the surface plate, thereby stabilizing the package being carried.

Each of the previously mentioned extensible grippers comprises a package engaging tool mounted to the tool platform by means of a slidable carrier. The extensible grippers may include either hook-like members for engaging handholds formed in a tray of goods, or pincher members for engaging a tray of goods, whether the tray be of cardboard, plastics, metal, or other materials known to those skilled in the art and suggested by this disclosure.

Smooth-sided packages, such as closed cardboard cartons may be picked by the plurality of package-carrying vacuum units which are arranged in a generally planar array at one end of a space frame comprising the tool platform. Package grippers are mounted within space frame adjacent to the generally planar array, with the package grippers having at least a retracted position inboard of the planar array and extended position outboard of the planar array. Similarly, the package platform has at least a retracted position inboard of the planar array and an extended position outboard of the planar array.

According to another aspect of the present invention, a machines vision unit is operatively connected with a controller which operates not only the robot to which the end of arm tool is attached, but also the vacuum units, package grippers, and sliding package platform. Using techniques which are known to those skilled in the art and beyond the scope of this invention, the machine vision unit provides the controller with an image of a package being handled, so as to permit the controller to select the use of either the vacuum units or package grippers or a combination of the vacuum units and the package platform. In the event that both the package platform and the vacuum units are used, the end of arm tool will be oriented such that the surface plate through which the vacuum units erupt will be situated in a generally vertical orientation, with the sequence of attaching to the end of arm tool following the steps of using the vacuum units and the robot to lift the package while deploying the sliding package platform under the lifted package. In this manner, the sliding package platform may be positioned under the package without pushing the package from its position on a supply pallet.

According to another aspect of the present invention, a method for picking up a package includes the steps of determining at least one characteristic of a package being picked up, communicating the determined characteristic to a controller, and using the controller to select from a plurality of package attachment systems carried upon an end of arm tool, with the controller making the selection based upon the previously described characteristic. Then, at least one selected package attachment system is presented to a package by means of a robot having the end of arm tool attached thereto, with the robot being operated by the controller. The ultimate step is attachment of the package to the end of arm tool by means of the selected package attachment system.

It is an advantage of the present invention that a single end of arm tool may accommodate a large number of packages having different sizes, shapes, construction and configuration, ranging from plastic trays having multiple packages of bottles contained therein, to smooth sided cardboard or plastic packages, to cardboard tray packages.

It is a further advantage of the present invention that this invention allows the breaking down of homogeneous package pallets into mixed pallets without the need for human operators.

Other advantages, as well as features and objects of the present invention will become apparent to the reader of this specification.

BRIEF DESCRIPTION OF THE DRAWINGS

FIG. 4 illustrates the present multi-modal package handling system picking up a tray of beverage bottles.

FIG. 5 is an enlarged portion of FIG. 4, showing additional details of construction of the present end of arm tool.

DETAILED DESCRIPTION OF PREFERRED EMBODIMENTS

Figure 1:
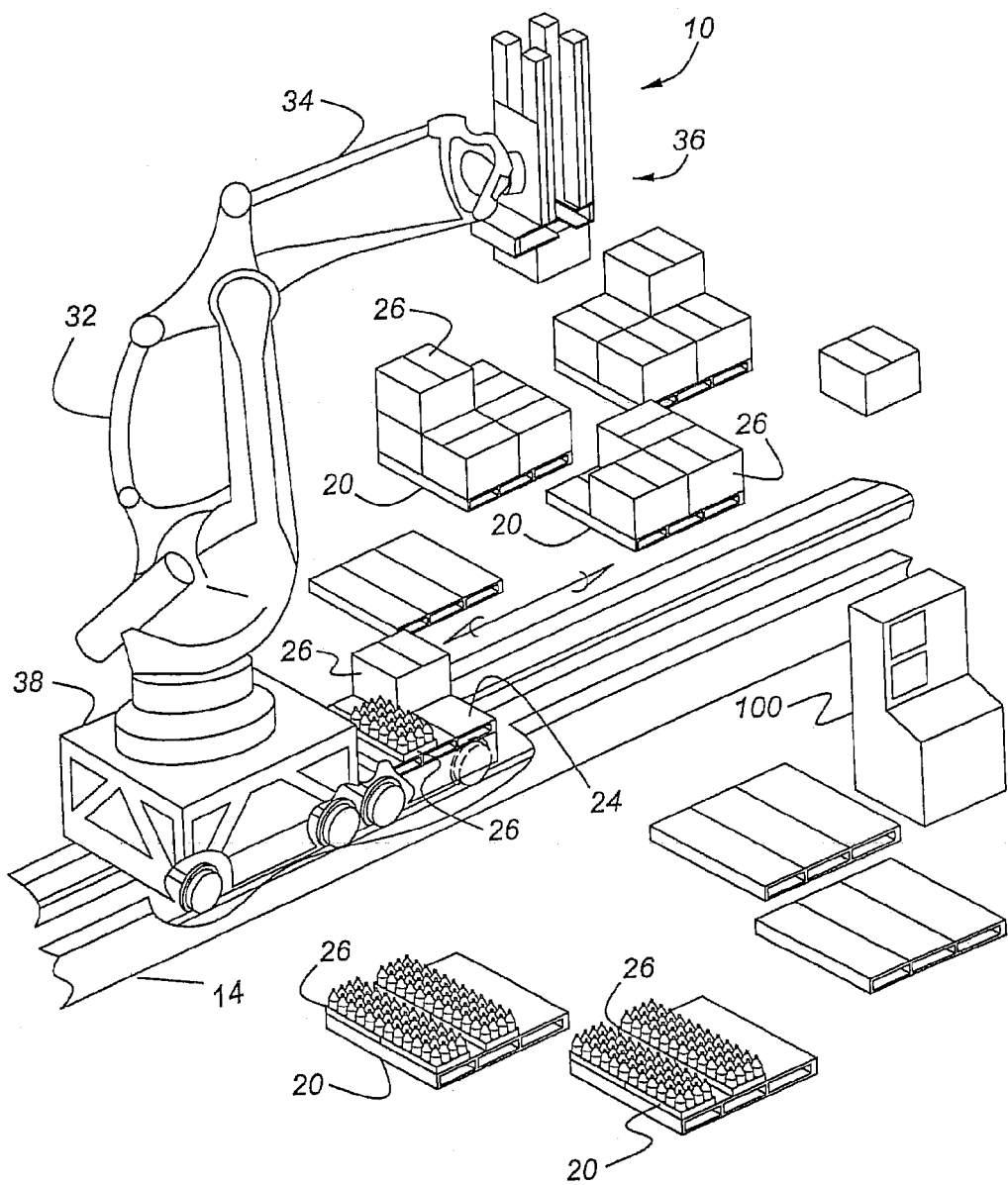
FIG. 1 is a perspective view of a multi-modal package handling system according to the present invention.

As shown in FIG. 1, the present multi-modal package handling system is preferably used in conjunction with guideway 14, which is situated between adjacent rows of supply pallets 20. Robot 32 has robot arm 34, to which multi-modal package handling tool 36 is mounted. In turn, robot 32 is mounted upon carriage 38, which also transports shipping pallet 24, which is ultimately filled with goods 26 removed from pallets 20. System 10 traverses guideway 14, picking various items or packages 26 from pallets 20, depositing them on shipping pallet 24. When shipping pallet 24 is full, pallet 24 is removed from carriage 38 and placed in line for transport from the storage facility.

Figure 2:
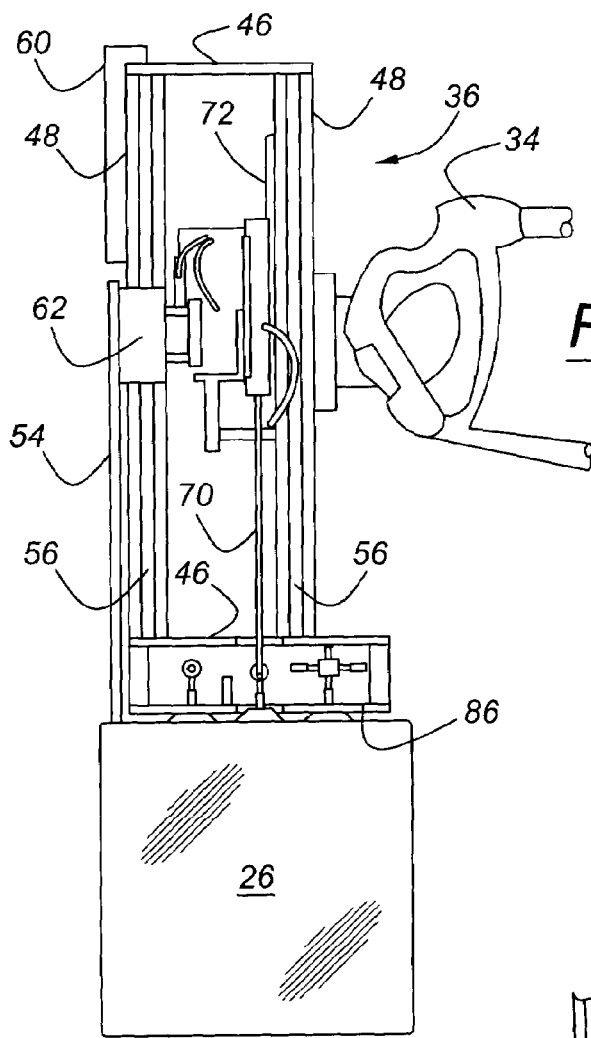
FIG. 2 is a perspective view of a portion of the system in FIG. 1, showing the present handling system picking up a smooth-sided cardboard carton.

FIG. 2 shows certain details of a portion of a system according to present invention. Multi-modal package handling tool 36 includes end plates 46, between which a four columns 48 are mounted. End plates 46 and columns 48 define a space frame to which various other components are mounted. The space frame is mounted to robot arm 34. FIG. 2 illustrates end of arm tool 36 picking up a smooth sided cardboard carton, 26. This carton is being picked by means of vacuum units, 76, which are described in greater detail later in this specification.

FIG. 2 additionally shows slidingly deployable package platform 54, which is mounted upon sliding mount 62. Columns 48 each have a plurality of mortises 56 which are engaged by mount 62. Slidingly deployable package platform 54 is positioned by means of cylinder 60, which has a fixed end mounted to the space frame defined by columns 48 and end plates 46. Usage of sliding platform 54 is further described in connection with the discussion of FIG. 9. FIG. 2 also shows gripper 70, which is positioned by means of cylinder 72. Gripper 70 is swung into deployment by means of a cylinder, 73, which is shown with greater specificity in FIG. 4. Those skilled in the art will appreciate in view of this disclosure that, as used herein, the term "cylinder" means either a conventional pneumatic cylinder, or a hydraulic, or an electrically driven device, or yet other types of linear actuators used within various types of machinery.

Figure 3:
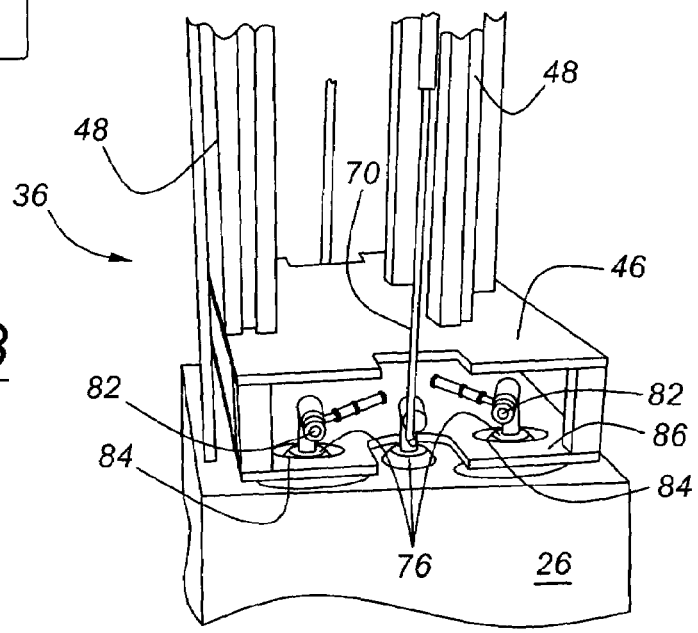
FIG. 3 is a segment of the illustration of FIG. 2, albeit from a different perspective, showing additional design elements of an end of arm tool according to the present invention.

FIGS. 3 and 5 show the construction of surface plate 86, which has a plurality of ports, 84, formed therein. Each of vacuum units 76 includes a multi-ribbed cup which is fed vacuum by means of a dedicated vacuum generator, 82. The present inventors have determined that a vacuum generator model VGS3010.AC.04.BH from the PIAB company is preferred for practicing the present invention. Vacuum generators 82 are shown with greater specificity in FIG. 5.

When the multi-ribbed vacuum cups incorporated within vacuum devices 76 are activated by providing compressed air to vacuum generators 82, the vacuum ribbed cups contract axially, causing the package being picked to be pulled up tightly to surface place 86. This is shown specifically in FIG. 2. As noted above, each of vacuum generators 82 shown in FIG. 5 is independently powered. In other words, compressed air is supplied to each of the vacuum generators 82, but there is no manifolding for interconnecting the vacuum output side of vacuum generators 82. Each vacuum generator 82 provides vacuum to a single vacuum unit 76, and this is important because in the event that a vacuum cannot be pulled on any one or more of vacuum units 76, vacuum may still be pulled on the remaining units.

Figure 6:
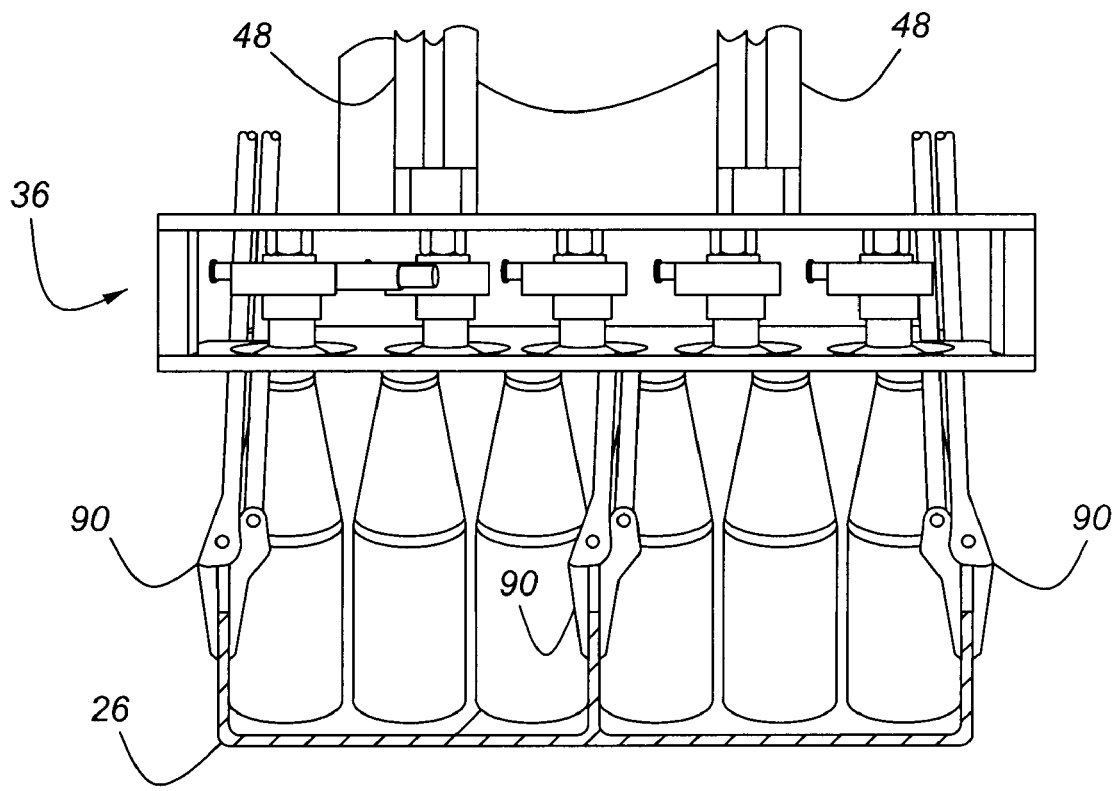
FIG. 6 is similar to FIG. 5, but depicts pincer type package grippers mounted to the end of arm tool.

The drink bottles shown in FIG. 5 are pulled up tightly against surface plate 86, but this is due to the action of package grippers 70, which pull upon tray 26 of FIG. 5. Vacuum units 76 are normally not employed to pick bottles such as those illustrated in FIG. 5. FIG. 6 is similar to FIG. 5, but shows a pincer, 90, which is used in a plurality of locations similar to the locations used with respect to package grippers 70. Pincers 90 are particularly useful for gripping cardboard shipping trays, either at the ends of such trays, or in certain cases, at the center of the tray. Pincers 90 may be actuated either by hydraulic or pneumatic cylinders, or by other types of linear force/motion devices known to those skilled in the art and suggested by this disclosure. The application of such devices is beyond the scope of this specification.

Figure 7:
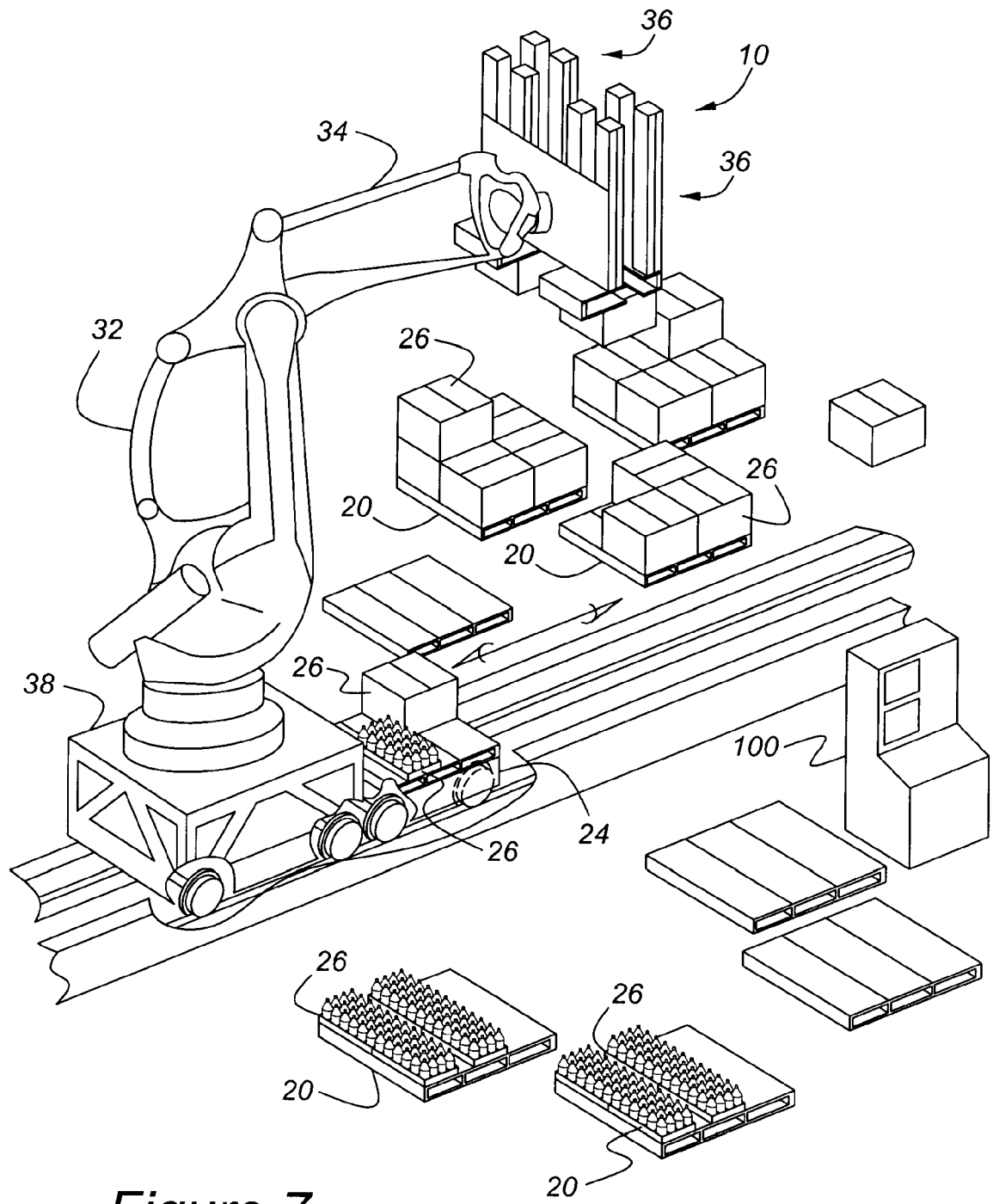
FIG. 7 is similar to FIG. 1 but illustrates two end of arm tools mounted to a single robot arm.

FIG. 7 is similar to FIG. 1, but shows two end of arm tools 36 mounted on a single robot arm 34. This configuration may be pursued in an effort to increase the throughput of a system according to the present invention.

Figure 8:
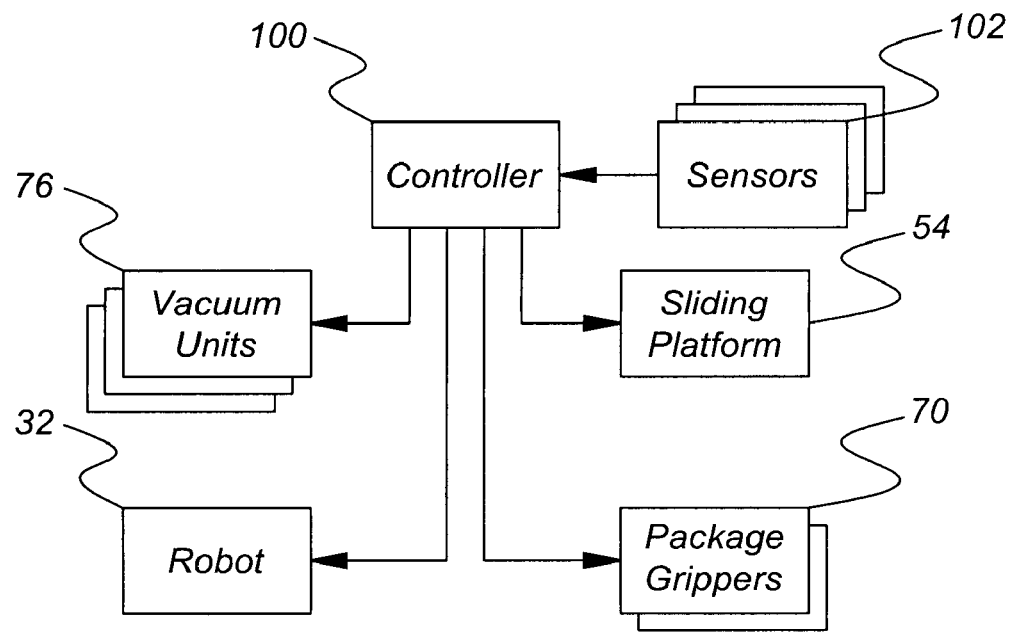
FIG. 8 is a block diagram of a portion of a control system according to one aspect of the present invention.

FIG. 8 is a block diagram according to the present invention, and shows controller 100 as receiving inputs form sensors 102. A variety of different sensors such as regular, low light, or infrared cameras, radio frequency tagging, or other types of devices known to those skilled in the art and suggested by this disclosure may be employed for the purpose of determining a characteristic of the package being picked. This characteristic may, for example, be the amount of open area in the top surface of the package, which would indicate whether the package is a tray of bottles having a large amount of open area, or a smooth cardboard carton having little or no open areas. In any event, inputs from various sensors 102 are used by controller 100 to selectively operate vacuum units 76, robot 32, package grippers 70, and sliding platform 54 to pick a package having a detected characteristic.

Figure 9:
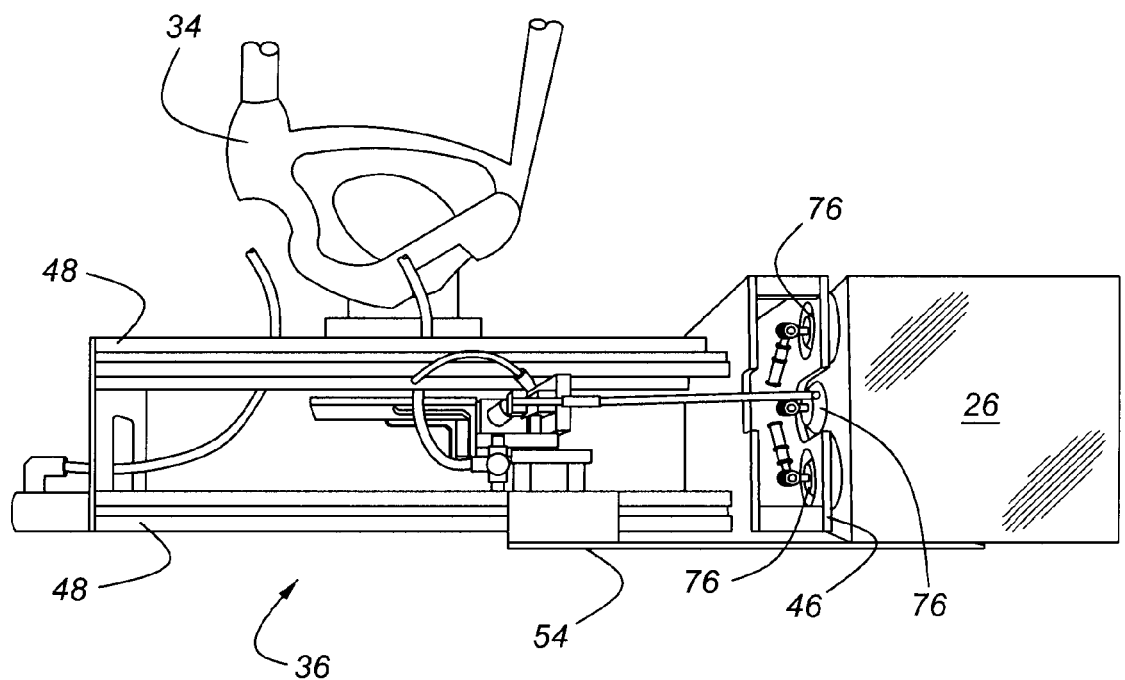
FIG. 9 illustrates a multi-modal package pickup operation involving not only vacuum units, but also a sliding package platform.

FIG. 9 illustrates another multi-modal function according to the present invention in which end of arm tool 36 picks a package from one side by first attaching to the side of package 26 with at least one vacuum unit 76. Then, package 26 will be lifted by robot 32 so that cylinder 60 is able to extend slidingly deployable package platform 54 under package 26 without pushing package 26 from its immediately previous location.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A multi-modal package handling tool, comprising:
   a tool platform;
   a plurality of package-carrying vacuum units arranged in a generally planar array, with said vacuum units being attached to a first portion of said tool platform;
   a plurality of extensible package grippers mounted to said tool platform, with said extensible grippers having at least a retracted position and an extended position; and
   a slidingly deployable package platform mounted to said tool platform, with said package platform having at least a retracted position and an extended position.

2. A multi-modal package handling tool according to claim 1, wherein each of said vacuum units comprises a vacuum head powered by a dedicated vacuum generator.

3. A multi-modal package handling tool, comprising:
   a tool platform;
   a plurality of package-carrying vacuum units arranged in a generally planar array, with said vacuum units being attached to a first portion of said tool platform and wherein each of said vacuum units comprises a vacuum head powered by a dedicated vacuum generator, and wherein each of said vacuum heads extends through a port formed in a surface plate attached to said tool platform, such that a package engaged by one or more of said vacuum heads will be caused to contact said surface plate; and
   a plurality of extensible package grippers mounted to said tool platform, with said extensible grippers having a least a retracted position and an extended position.

4. A multi-modal package handling tool according to claim 1, wherein each of said extensible grippers comprises a package engaging tool mounted to said tool platform by means of a slidable carrier.

5. A multi-modal package handling tool according to claim 4, wherein each of said extensible grippers comprises a hook-like member for engaging a tray of goods.

6. A multi-modal package handling tool according to claim 4, wherein each of said extensible grippers comprises a pincer member for engaging a tray of goods.

7. A multi-modal package handling tool according to claim 6, wherein at least one of said extensible grippers comprises a pincer member for engaging a central structural member incorporated in a tray of goods.

8. A multi-modal package handling tool, comprising:
   a tool platform comprising a space frame;
   a plurality of package-carrying vacuum units arranged in a generally planar array, with said vacuum units being attached to a first portion of said space frame;
   a plurality of package grippers mounted within said space frame adjacent said generally planar array, with said package grippers having at least a retracted position inboard of said planar array and an extended position outboard of said planar array; and
   a slidingly deployable package platform mounted to said space frame.

9. A multi-modal package handling tool according to claim 8, wherein said package platform has at least a retracted position inboard of said planar array and an extended position outboard of said planar array.

10. A multi-modal package handling system, comprising:
    a robot having a robot arm operable along a plurality of axes;
    a tool platform attached to said robot arm;
    a plurality of package-carrying vacuum units arranged in a generally planar array, with said vacuum units being attached to a first portion of said tool;
    a plurality of extensible package grippers mounted to said tool platform, with said extension grippers having at least a retracted position and an extended position;
    a controller for operating said robot, said vacuum units, and said package grippers; and
    a slidingly deployable package platform mounted to said tool platform, with said package platform having at least a retracted position and an extended position.

11. A multi-modal package handling tool according to claim 10, further comprising a machine vision unit, operatively connected with said controller, for providing said controller with an image of a package being handled, so as to permit said controller to select use of either said vacuum units, or said package grippers, or said package platform, for handling the imaged package.

12. A multi-modal package handling tool according to claim 10, further comprising a second tool platform attached to said robot arm, with said second tool platform comprising a plurality of package-carrying vacuum units and a plurality of extensible package grippers.

13. A multi-modal package handling tool according to claim 10, further comprising a guideway having a carriage mounted thereupon for reciprocating movement, with said robot being mounted upon said carriage.

14. A method for picking up a package, comprising the steps of:
    determining at least one characteristic of a package being picked up;
    communicating said determined characteristic to a controller;
    using the controller to select from a plurality of package attachment systems carried upon an end of arm tool, with said controller making the selection based upon said characteristic;
    presenting at least one selected package attachment system to a package by means of a robot having the end of arm tool attached thereto, and with said robot being operated by said controller; and
    attaching the package to the end of arm tool by means of the selected at least one attachment system, said attaching step further comprises the step of using a plurality of package-carrying vacuum units and said robot to lift the package after attaching said vacuum units to a first surface of the package, while deploying a sliding package platform under a second surface of the lifted package.

* * * * *